US012762871B2

(12) United States Patent
Cheng et al.

(10) Patent No.: US 12,762,871 B2
(45) Date of Patent: Oct. 13, 2026

(54) EDGE-COMPUTING METHOD FOR AUTOMATIC LICENSE PLATE RECOGNITION AND SYSTEM THEREOF

(71) Applicant: Getac Technology Corporation, New Taipei City (TW)

(72) Inventors: Ming-Che Cheng, Taipei City (TW); Chih-Hao Tsai, Taipei City (TW); Chang-Jan Peng, Taipei City (TW); Chen-Tai Wang, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 100 days.

(21) Appl. No.: 18/408,703

(22) Filed: Jan. 10, 2024

(65) Prior Publication Data

US 2025/0139997 A1 May 1, 2025

(30) Foreign Application Priority Data

Oct. 27, 2023 (CN) ........................ 202311412660.6

(51) Int. Cl.
*G06V 20/62* (2022.01)
*G06T 7/90* (2017.01)
(Continued)

(52) U.S. Cl.
CPC .............. *G06V 20/625* (2022.01); *G06T 7/90* (2017.01); *G06V 10/44* (2022.01); *G06V 10/764* (2022.01);
(Continued)

(58) Field of Classification Search
None
See application file for complete search history.

(56) References Cited

U.S. PATENT DOCUMENTS 8,781,172 B2 7/2014 Kozitsky et al.
10,777,076 B2 9/2020 Chen et al.
(Continued)

FOREIGN PATENT DOCUMENTS

CN 112115904 A * 12/2020 ............. G06F 18/25
CN 115937837 A 4/2023
(Continued)

OTHER PUBLICATIONS

Quiala et al. “Enhancing License Plate Recognition in Videos Through Character-Wise Temporal Combination”, 8th International Congress on Artificial Intelligence and Pattern Recognition, IWAIPR 2023, Varadero, Cuba, Sep. 27-29, 2023, pp. 400-411. ( Year: 2023).*

(Continued)

*Primary Examiner* — James M Anderson, II
(74) *Attorney, Agent, or Firm* — Cooper Legal Group, LLC

(57) ABSTRACT

An edge-computing method and an edge-computing system for automatic license plate recognition are provided. The edge-computing method is performed in a terminal system of a vehicle. The edge-computing system includes a photographing module and a computing circuit. A streaming video is generated by the photographing module. An object-detection model is used to identify a license plate in each frame of the video and recognize characters from an image of the license plate. A confidence algorithm is used to calculate a confidence level of each of the characters and a confidence score of all of the characters. Confidence scores of the license plate in continuous frames within a period of time are calculated, and the frame having a highest confidence score is stored in a memory. Afterwards, a classification model is used to recognize features of vehicle, such as a vehicle jurisdiction, a color, a brand, and a model.

20 Claims, 7 Drawing Sheets

(51) Int. Cl.

| | |
|---|---|
| ***G06V 10/44*** | (2022.01) |
| ***G06V 10/764*** | (2022.01) |
| ***G06V 20/56*** | (2022.01) |
| ***G06V 30/19*** | (2022.01) |

(52) U.S. Cl.

CPC ........ *G06V 20/56* (2022.01); *G06V 30/19093* (2022.01)

(56) References Cited

U.S. PATENT DOCUMENTS

| | | | | |
|---|---|---|---|---|
| 12,175,578 | B1 * | 12/2024 | Campbell | G06T 13/00 |
| 2002/0140577 | A1 * | 10/2002 | Kavner | G07B 15/063 340/928 |
| 2022/0309809 | A1 * | 9/2022 | Normington | G06V 30/10 |
| 2023/0315767 | A1 | 10/2023 | Roche | |
| 2024/0143601 | A1 * | 5/2024 | Blais-Morin | G06F 18/24133 |

FOREIGN PATENT DOCUMENTS

| | | | |
|---|---|---|---|
| CN | 116152691 | A | 5/2023 |
| CN | 116824565 | A | 9/2023 |
| CN | 116912814 | A | 10/2023 |
| TW | I561419 | B | 12/2016 |
| TW | I677826 | B | 11/2019 |
| TW | 202202695 | A | 1/2022 |

OTHER PUBLICATIONS

Quiala, et al., "Enhancing License Plate Recognition in Videos Through Character-Wise Temporal Combination",8th International Congress on Artificial Intelligence and Pattern Recognition, IWAIPR 2023, Varadero, Cuba, Sep. 27-29, 2023, Proceedings, XP093164187, vol. 14335, pp. 400-411.

Ashrafee, et al., "End-to-End License Plate Recognition Pipeline for Real-time Low Resource Video Based Applications", arxiv. org,Cornell University Library,201 Olin Library Cornell University Ithaca, NY 14853, Aug. 18, 2021(Aug. 18, 2021),XP091035274,pp. 1-10.

Arth, et al., "Real-Time License Plate Recognition on an Embedded DSP-Platform",Computer Vision and Pattern Recognition,2007, CVPR07.IEEE Conference On,Jun. 2, 2007(un. 2, 2007), pp. 1-8, XP0055917788.

Search Report issued on Jun. 4, 2024 for EP application No. 24152844.7, 13 pages.

* cited by examiner

EDGE-COMPUTING METHOD FOR AUTOMATIC LICENSE PLATE RECOGNITION AND SYSTEM THEREOF

CROSS-REFERENCE TO RELATED PATENT APPLICATION

This application claims the benefit of priority to China Patent Application No. 202311412660.6, filed on Oct. 27, 2023, in the People's Republic of China. The entire content of China Patent Application No. 202311412660.6 is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an automatic license plate recognition technology operated in a terminal device, and more particularly to an edge-computing method and an edge-computing system for automatic license plate recognition that applies an intelligent model to process license plate data.

BACKGROUND OF THE DISCLOSURE

With the development of image artificial intelligence technology, the technology of image recognition (such as license plate recognition) has gradually matured. For example, automatic license plate recognition (ALPR) system is often used in locations that include parking lots and roads where traffic enforcement cameras are installed. However, an image recognition model typically requires considerable computing power to achieve a training process by a neural network, and the training process is not suitable for a terminal device with relatively low computing power. Therefore, the ALPR system with such image recognition model is disadvantageous for use in the terminal device that is required to perform license plate recognition under various environments.

SUMMARY OF THE DISCLOSURE

In response to the problem that the automatic license plate recognition (ALPR) technology cannot operate in an edge device (such as a drive recorder) since the ALPR technology requires a huge amount of computing resources, and the problem that the ALPR technology needs to satisfy the requirement of applying license plate recognition in various circumstances (such as weather changes and brightness changes), the present disclosure provides an edge-computing method and an edge-computing system for automatic license plate recognition. The edge-computing method is applicable to the edge device (such as an IoT (Internet of things) device and a drive recorder) that is insufficient in computing power to handle real-time computation of high-resolution and high-frame-rate streaming videos.

According to one embodiment of the edge-computing method for automatic license plate recognition, the method can be performed in the edge device. A photographing module of the edge device is used to capture a streaming video, and a processor of the edge device uses an object-detection model to frame-by-frame determine one or more license plates and retrieve images of the license plates in each frame. Afterwards, characters in each of the license plates can be frame-by-frame recognized. A confidence level algorithm is used to calculate a confidence level of each of the characters. A confidence score can be frame-by-frame obtained according to the confidence levels of all of the characters recognized in each of the license plates.

Next, in continuous frames, the confidence score of each of the license plates is calculated multiple times within a period of time, so as to acquire the image of the license plate having a highest confidence score. A recognition result is generated. A full frame image having the highest confidence score is stored.

Further, in the method, an intelligent model is incorporated to recognize the one or more characters in each of the license plates, and an intelligent algorithm is used to calculate the confidence level of each of the characters in each of the license plates. Preferably, the confidence score of the license plate is a statistical value obtained by calculating the confidence levels of the characters in each of the license plates.

When the confidence score of the license plate is calculated, a quantity of the recognized characters of the license plate is required to exceed a character-quantity threshold preset by the edge-computing system. However, if the quantity of the recognized characters of the license plate is lower than the character-quantity threshold, the license plate is excluded from a license plate tracking process since the recognition result is regarded as unreliable.

Further, when the frame having the highest confidence score of the license plate is obtained, vehicle information is obtained from the frame by an image processing technology, and the vehicle information is then written into metadata of the frame.

The edge device operates the object-detection model to extract a boundary frame of the license plate in each of frames, calculate a probability that the boundary frame is one of the license plates, and calculate a probability that the license plate belongs to a vehicle type, so as to recognize the one or more characters in the license plate.

The edge device operates a classification model for calculating a probability that the license plate is under a vehicle jurisdiction, calculating a probability that the vehicle is one of a plurality of color, and calculating a probability that the vehicle belongs one of a plurality of brands and a models, so as to identify features of each of the vehicles.

After the characters of each of the license plates in the continuous frames are recognized, the license plate tracking process is performed. When any of the license plates in one of the frames is recognized, a target license plate in a first frame is selected, and a distance between the target license plate of the first frame and each of one or more license plates recognized in a second frame is individually calculated. Therefore, one or more corresponding license-plate distances are obtained. Next, strings of the target license plate of the first frame and the one or more license plates of the second frame are recognized, and a string similarity between the string that is recognized from the target license plate of the first frame and the string that is recognized from each of the license plates of the second frame can be individually calculated.

The license-plate distance and the string similarity between the target license plate of the first frame and each of the license plates of the second frame are referred to for calculating an overall score. This overall score is referred to for the edge-computing system to determine whether or not the target license plate in the first frame is any of the license plates in the second frame. Moreover, when any of the license plates in the second frame is determined to be the same as the target license plate in the first frame according to the overall score, both the license plates in the first frame and the second frame are assigned with a same identifier, so as to perform the license plate tracking process in the continuous frames.

Further, when the license plates having the same identifier in the continuous frames have been tracked for a period of time, the full frame image having the highest confidence score is stored, or a plurality of full frame images having the confidence scores that meet a threshold are stored.

According to one of the embodiments of the edge-computing system, the edge-computing system includes a photographing module, a memory, and a processor that performs the above-mentioned edge-computing method for automatic license plate recognition.

When the frame having the highest confidence score in the continuous frames is obtained through the edge-computing method for automatic license plate recognition, the frame and a recognized string of the license plate are transmitted to an external system, such as a computer device or a cloud system.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
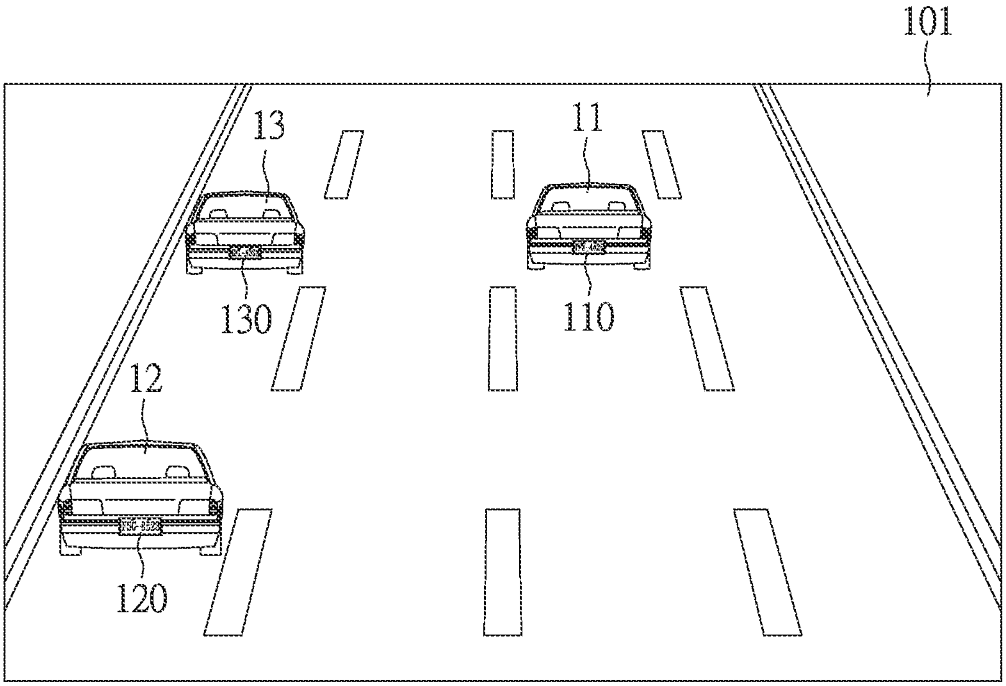
FIG. 1A and FIG. 1B are schematic diagrams illustrating circumstances in which an edge-computing method for automatic license plate recognition is performed.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to an edge-computing method and an edge-computing system for automatic license plate recognition (ALPR). The edge-computing method can be performed in a terminal device. The main components of the system include a photographing module, a processor, and a memory. The edge-computing method is applicable to a terminal device that is with a relatively low computing power. The edge-computing method uses an artificial intelligence technology to detect the position of a license plate in an image, recognize strings of the license plates, and perform license-plate tracking on the recognized license plate. In the ALPR process, confidence levels of the string that is recognized from the license plate can be calculated in real time. A frame having a highest confidence level can be cropped, and features of a vehicle can be obtained from the cropped image. For example, the features of the vehicle include characters of the license plate (plus the U.S. (United States) state identification), a vehicle type, and a brand (or a manufacturer). Further, the artificial intelligence technology can be used to identify the brand of the vehicle according to a vehicle appearance curve, and recognize the color of the vehicle. The feature can then be recorded in a metadata of the image.

Figure 1B:
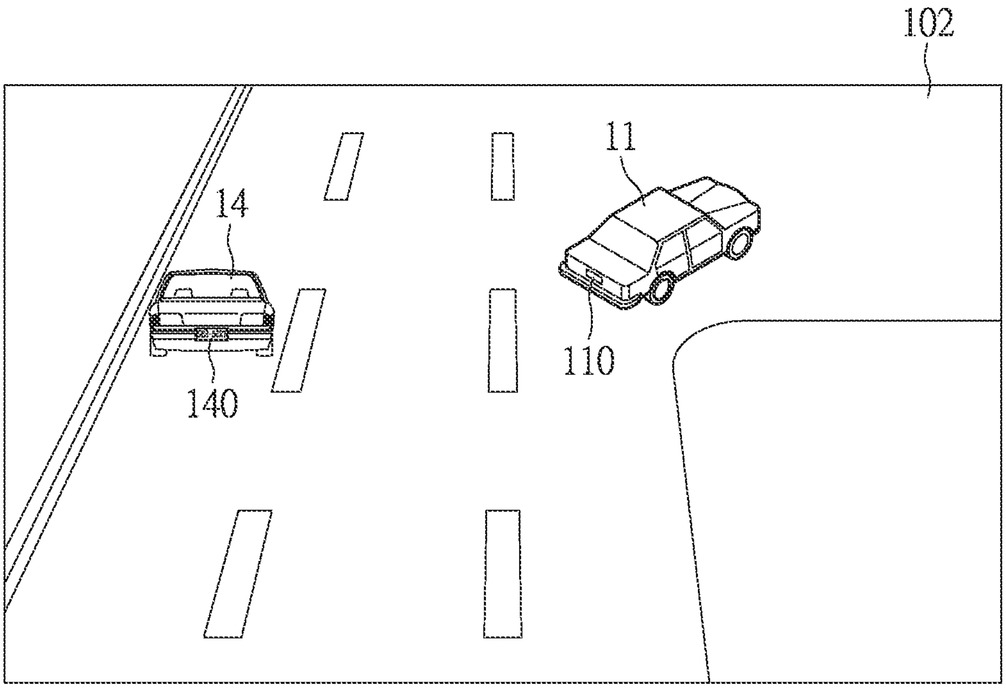

According to an applicable range of the edge-computing method for automatic license plate recognition, references are made to FIG. 1A and FIG. 1B, which are schematic diagrams illustrating circumstances in which the edge-computing method for automatic license plate recognition is performed.

FIG. 1A is a schematic diagram illustrating a first frame 101 that is captured by the photographing module of the terminal device (e.g., a drive recorder) in an exemplary example. The first frame 101 shows several vehicles 11, 12 and 13 in front of a rear vehicle where the terminal device is installed. An object-detection model operated in the terminal device is used to determine a license plate 110 of the vehicle 11, a license plate 120 of the vehicle 12, and a license plate 130 of the vehicle 13 in the first frame 101. In the present example, the vehicle 11 is selected to be a target vehicle, and the license plate 110 of the vehicle 11 is selected to be a target license plate.

FIG. 1B is another schematic diagram illustrating a second frame 102. The second frame 102 still includes the vehicle 11 that is selected to be the target vehicle, and the license plate 110 is still captured. In the edge-computing method for automatic license plate recognition, a license plate recognition technology is performed to track the vehicle 11 with the same license plate 110 in the continuous frames. In the present example, according to the recognition result for the license plate, the vehicles 12 and 13 that are parked on the roadside of the first frame 101 are no longer present in the second frame 102. However, the recognition result shows that another vehicle 14 with a license plate 140 is parked on the roadside of the second frame 102, and the vehicle 11 keeps appearing in the second frame 102.

Figure 2:
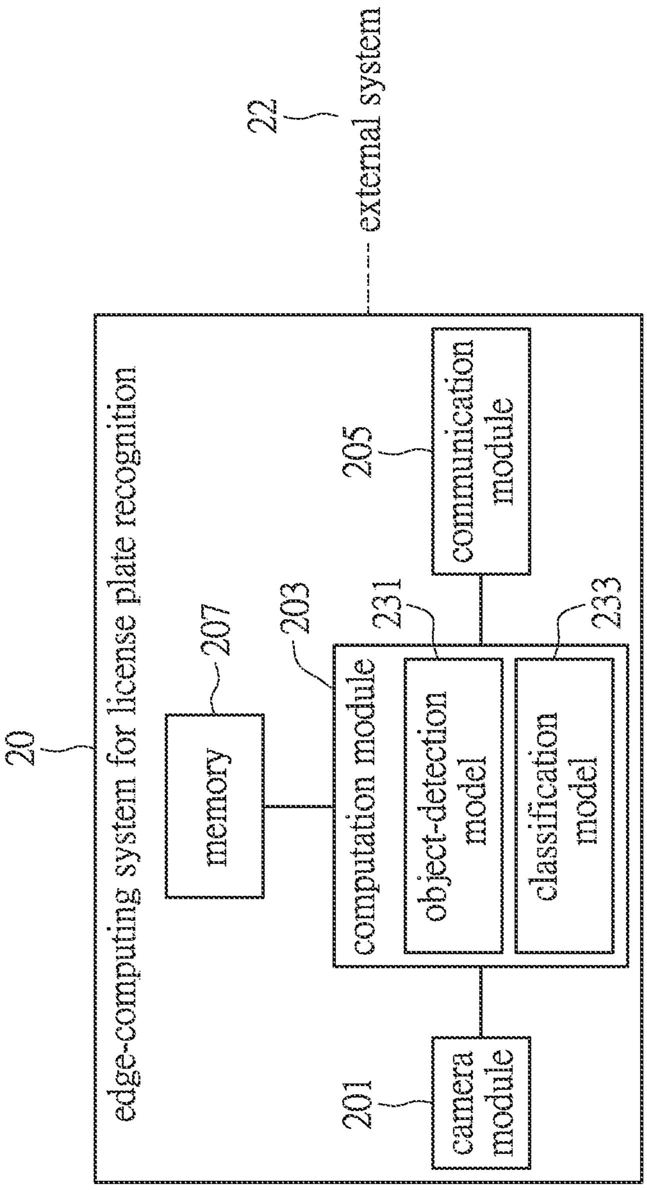
FIG. 2 is a schematic diagram illustrating a framework of an edge-computing system for automatic license plate recognition according to one embodiment of the present disclosure.

FIG. 2 is a schematic diagram depicting a framework of a system performing the edge-computing method for automatic license plate recognition according to one embodiment of the present disclosure. An edge-computing system 20 for automatic license plate recognition can be a circuit system that is disposed in the terminal device. The circuit system includes a photographing module 201 for capturing images, a computation module 203 for performing a license-plate recognition procedure, and a communication module 205 for transmitting data, and the photographing module 201, the computation module 203, and the communication module 205 are implemented by collaboration of hardware and software. The circuit system also includes a memory 207 that is used to store the images.

The photographing module 201 generates a streaming video, and the computation module 203 processes the video. The computation module 203 includes an object-detection model 231 that is used to determine positions of the license plates and a classification model 233 that is used to identify information of every license plate.

The object-detection model 231 is trained by a machine-learning algorithm that deeply learns features of some specific objects from a large number of training images. The object-detection model 231 can predict positions and types of various objects in an image. Taking a license plate as an example, the characteristics of the license plate generally include a rectangular appearance outline, a combination of characters with a specific font and English numerals, and some additional information (such as the jurisdiction to which the vehicle belongs).

Figure 5:
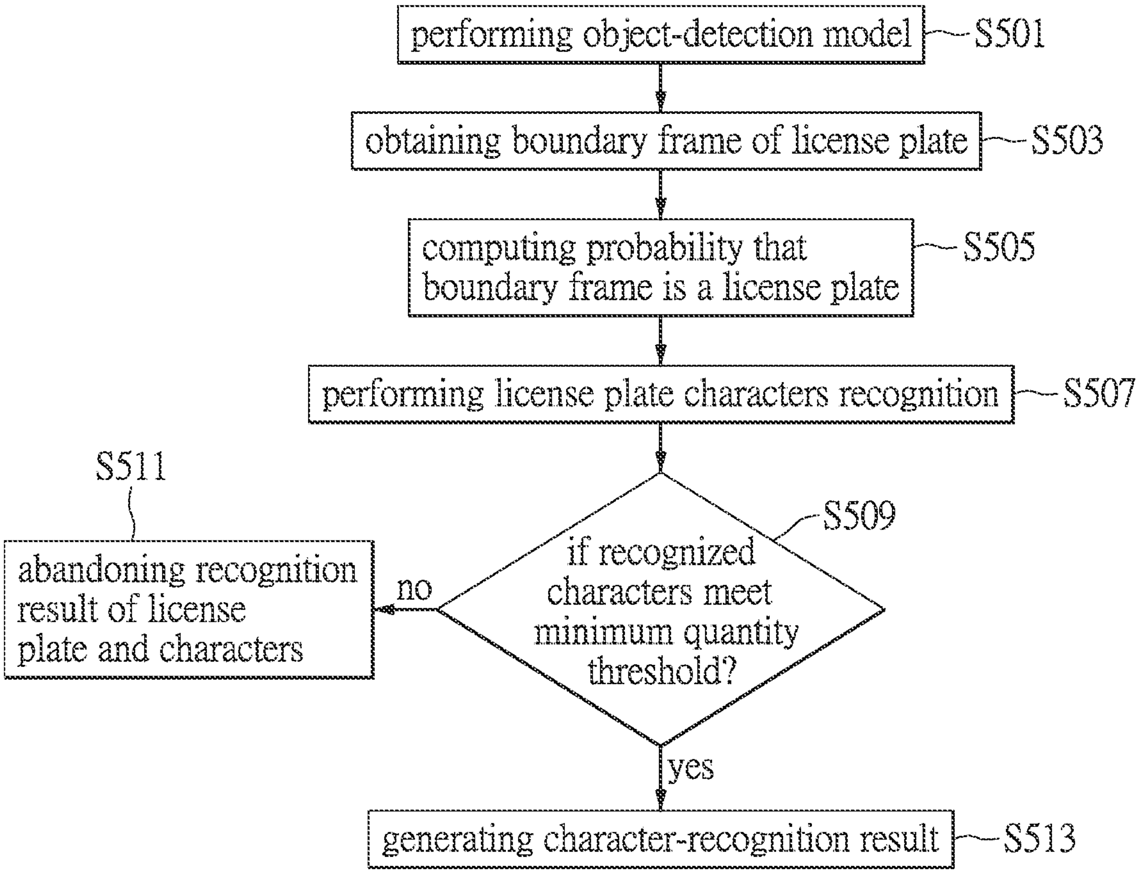
FIG. 5 is a flowchart illustrating an object-detection process in the edge-computing method for automatic license plate recognition according to one embodiment of the present disclosure.

Reference is made to FIG. 5, which is a flowchart describing the edge-computing method for automatic license plate recognition according to one embodiment of the present disclosure.

A processor is configured to perform the object-detection model 231 (step S501). The object-detection model 231 is established by performing the machine-learning algorithm that learns features of some objects in the images. Therefore, the object-detection model 231 can determine a boundary frame of each of the license plates in each of the frames (step S503). Then, a probability that the boundary frame is a license plate is calculated (step S505). The probability calculated by the object-detection model 231 can be used to confirm the position of any of the license plates. Next, the position of the license plate of each of the vehicles, the positions of the characters of the license plate, and the types of the characters can be obtained, so as to recognize the characters of the license plate (step S507).

When the characters of the license plate have been completely recognized, the system confirms if a sufficient quantity of the characters can be recognized by comparing with a minimum quantity threshold set by the system since the license plate number is generally a string consisting of the multiple characters. The minimum quantity threshold is, for example, a character-quantity threshold that is referred to for determining whether or not the quantity of the recognized characters from the license plate exceeds the character-quantity threshold (step S509). If the quantity of the recognized characters of the license plate is lower than the character-quantity threshold (represented as "no"), the recognition result is regarded as unreliable and is abandoned, and the vehicle having the unreliable recognition result is excluded from the subsequent processes of detecting and tracking the license plate (step S511). If the quantity of the recognized characters of the license plate is sufficient and exceeds the character-quantity threshold (represented as "yes"), the recognition result is outputted (step S513).

The classification model 233 is trained by the machine-learning algorithm that deeply learns the features of the information on various license plates from a large number of training images. The well-trained classification model 233 can be operated in the edge-computing system for automatic license plate recognition. The classification model 233 can be used to obtain a probability that every license plate is registered under one of different vehicle jurisdictions (e.g., a location of a vehicle office or a location of a government agency), a probability that the vehicle has a specific color, and a probability that the vehicle belongs to a specific brand and a vehicle model, so as to identify features of each of the vehicles. For example, the classification model 233 can identify a state government by which an American license plate is issued, and can identify a color, a brand, a manufacturer, and a model of the vehicle from the image of the vehicle. The vehicle information becomes a record in a metadata of the vehicle image.

The edge-computing system 20 for automatic license plate recognition includes the communication module 205 that is used to connect with an external system 22. The critical images, such as the frame having the highest confidence score and the recognized string of the license plate, are transmitted to the external system 22. In an aspect of the present disclosure, the external system 22 can connect with a computer device of the drive recorder or a cloud system by a wired or wireless connection.

Figure 3:
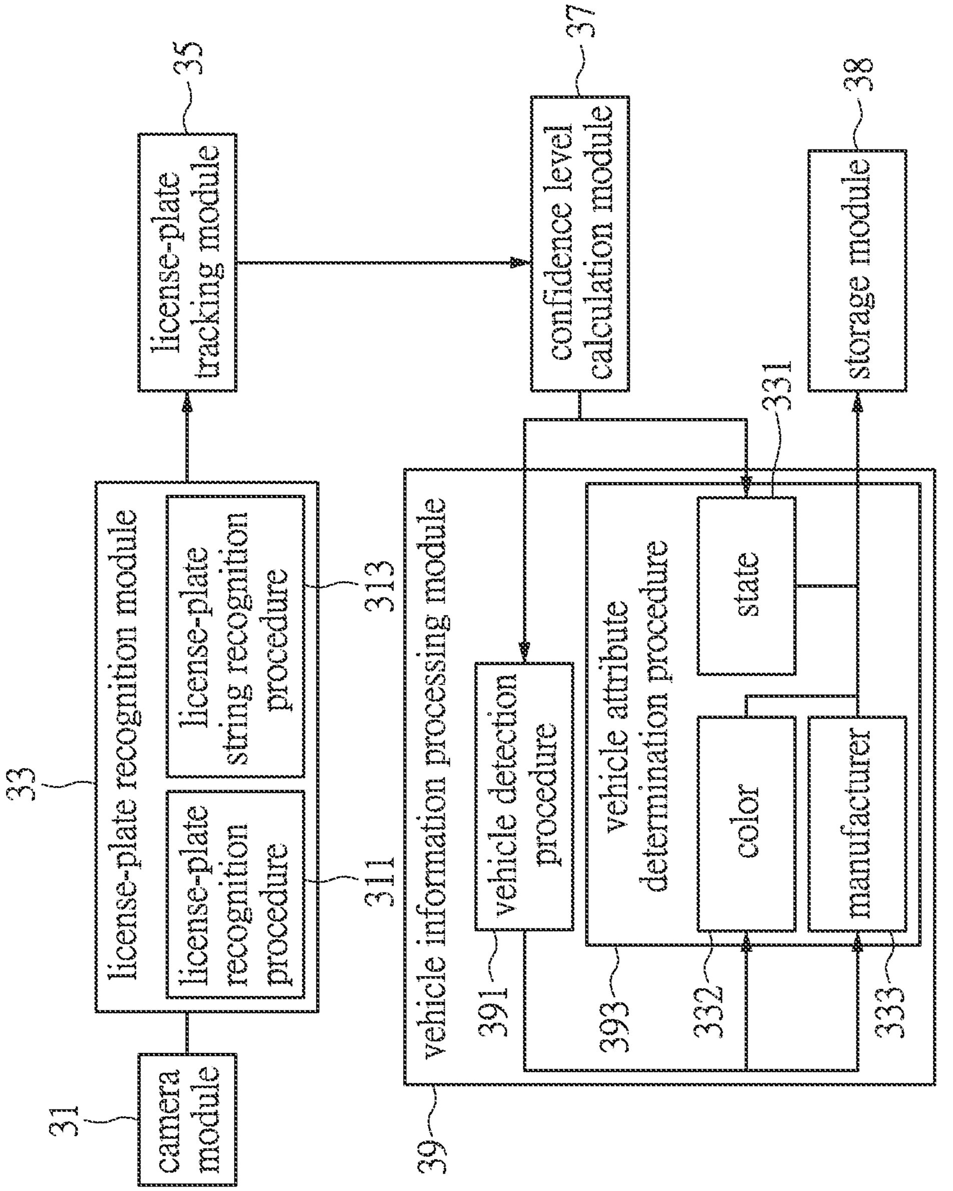
FIG. 3 is a schematic diagram illustrating one exemplary example of the edge-computing system for automatic license plate recognition.
Figure 4:
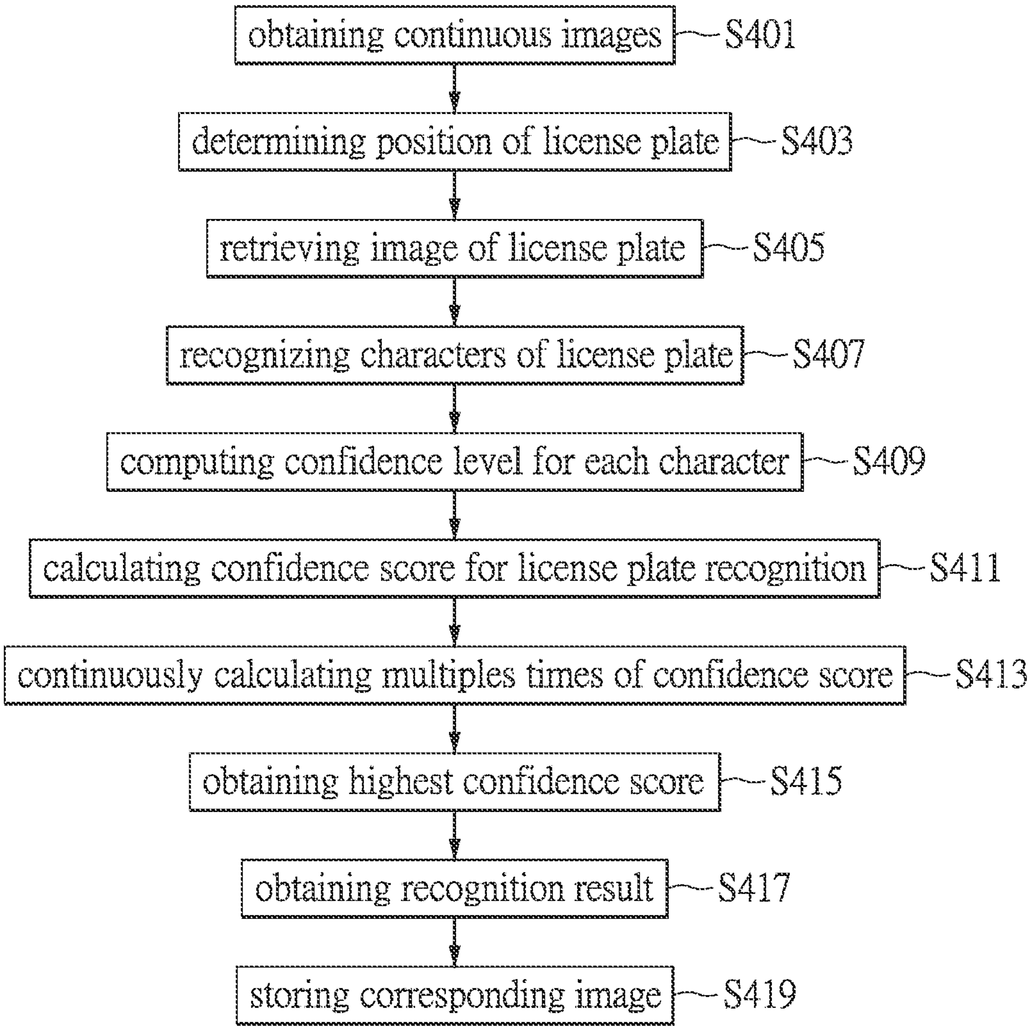
FIG. 4 is a flowchart describing the edge-computing method for automatic license plate recognition according to one embodiment of the present disclosure.

Further, reference can be made to FIG. 3, which is a schematic diagram illustrating processes and various intelligent models operated in the edge-computing system for automatic license plate recognition. The intelligent models operated in the edge-computing system are, for example, the above-mentioned object-detection model 231 and classification model 233. The edge-computing system provides various software functional modules that are implemented through collaboration of the intelligent models and hardware. Regarding the process operated in the system, reference can also be made to FIG. 4, which is a flowchart illustrating the edge-computing method for automatic license plate recognition according to one embodiment of the present disclosure.

The edge-computing system for automatic license plate recognition can be disposed in a terminal device, e.g., a drive recorder. When the photographing module 31 captures a streaming video consisting of continuous frames (step S401), a license-plate recognition procedure 311 performed by a license-plate recognition module 33 is used to recognize positions of one or more license plates in the images (step S403). According to the above embodiment, the license-plate recognition procedure 311 performs an object-detection process that is used to identify a boundary frame of the license plate of each of the vehicles in every frame. The license-plate recognition procedure 311 also calculates a probability that the boundary frame is a license plate and a probability that the license plate belongs to any vehicle type. Afterwards, a license-plate image can be extracted from the image according to the position of the license plate in the recognition result (step S405). The license-plate image can be temporarily buffered in the memory. Next, the system performs a license-plate string recognition procedure 313 to process license plate character recognition based on a character detection technology (step S407).

An image of the license plate is acquired when the license plate has been recognized. In general, the size of the image of the license plate is much smaller than the size of the original frame. Therefore, the system can recognize the characters of the license plate more efficiently if only the image of the license plate is used for automatic license plate recognition, and the computing power required for image processing can be reduced. Afterwards, a license-plate tracking module 35 is used to track the recognized license plate in every frame according to the position of the license plate in each of the frames. For example, when the position of a target license plate is determined in a first frame of the continuous frames, the system assigns an identifier to the target license plate, and obtains a cropped image of the license plate. Similarly, when the target license plate having the same identifier is also recognized in a second frame, the image of the license plate is cropped. In this way, the license plate can be tracked.

During the process of tracking the license plate, the characters of the license plate can be recognized at the same time. A confidence level calculation module 37 of the system performs a confidence level algorithm to calculate a confidence level of every character that is recognized from the license plate (step S409). The confidence level for every character to be recognized by an intelligent model from the license plate is a probability that every character is a specific letter or a numeral and is calculated by an intelligent algorithm. The intelligent model is specified to recognize the characters consisting of letters and numerals of the license plate. The system sets up a probability threshold or a confidence level threshold. The recognition result shows the characters having the highest probabilities and being higher than the probability threshold.

Next, when the confidence levels of all or more than a certain number of recognized characters of the license plate are calculated completely, the confidence level calculation module 37 can frame-by-frame calculate confidence scores of the characters of the license plate according to the confidence levels of all of the characters of the license plate (step S411). The confidence score of the license plate is a statistical value that is calculated according to the confidence levels of the characters of the license plate. The statistical value can be, but is not limited to, an average value, a sum, or an overall score by weight allocation of the confidence levels of all of the characters recognized from the license plate. For example, a higher weight is applied to the character having a higher confidence level. It should be noted that the method is not limited to the abovementioned statistics of the confidence levels of the characters.

The above-described step S411 and step S413 can be used to calculate the confidence score of each of the license plate in the continuous frames (step S413). When multiple confidence scores of each of the license plates are calculated within a period of time, a highest confidence score in the continuous frame within the period of time can be obtained (step S415). Alternatively, multiple confidence scores of the license plate in the continuous frames can be calculated at intervals within the period of time. The frame having the highest confidence score should be obtained before the license plate disappears. In the meantime, since the same license plate appears in the continuous frames, the confidence score can be calculated in each of the continuous frames, so that the highest confidence score can be obtained. The license plate having the highest confidence score forms the recognition result (step S417). Therefore, if multiple license plates appear in the same continuous frames, the license plate having the highest confidence score can be obtained, and a full frame that corresponds to the license plate is stored (step S419).

In FIG. 3, according to the results obtained by the confidence level calculation module 37, the image of a full frame that corresponds to the license plate having the highest confidence score is provided to a vehicle detection procedure 391 of a vehicle information processing module 39. On the other hand, the frame that includes the license plate having the highest confidence score can be processed by an image-processing technology for extracting vehicle information from the frame. The vehicle information is then written into a metadata of the image of the frame.

In another application, when the frame that includes the license plate having the highest confidence score in the continuous frames is obtained, the frame and the string of the license plate are transmitted to an external system. For example, the external system can be an in-vehicle computer system or a remote control center. The vehicle information recognized by the terminal device (e.g., the drive recorder) or other edge devices can be stored and displayed on a monitor in real time for real-time monitoring of the external system.

It should be noted that, when the confidence score of the license plate is calculated, the recognition result is valid only if a sufficient number of characters are recognized (as shown in the flowchart of FIG. 5). If the number of recognized characters of the license plate is too small, the recognition result is unreliable and can be excluded from the license plate tracking process.

The content to be recognized from the license plate image that is cropped from one of the continuous frames by the confidence level calculation module 37 includes the image of the license plate having the highest confidence score and the full frame that corresponds to the license plate having the highest confidence score. The image of the full frame and the image of the license plate can be provided for the vehicle information processing module 39. The image of the full frame is provided for the vehicle detection procedure 391 to detect the vehicle. After the vehicle is detected, an image of the vehicle can be cropped. The cropped image of the vehicle can be provided for a vehicle feature determination procedure 393 to determine features of the vehicle. The features of the vehicle are, for example, a color 332 and a brand 333 of the vehicle. On the other hand, the license plate image can be provided for the vehicle feature determination procedure 393 to identify the vehicle jurisdiction (e.g., a state 331). Lastly, along with the image of the vehicle, the features of the vehicle (such as the state 331, the color 332, and the brand 333 determined by the vehicle feature determination procedure 393) can be stored to a storage module 38.

Figure 6:
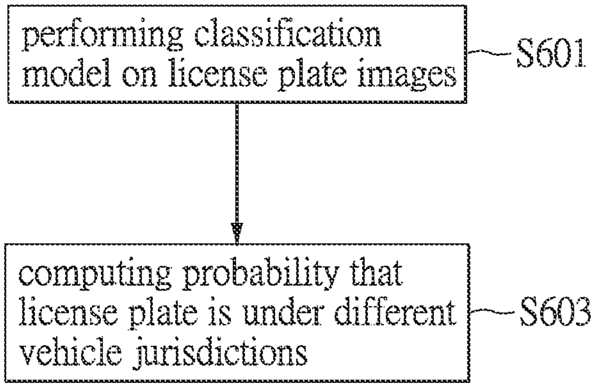
FIG. 6 is a flowchart illustrating an object-classification process in the edge-computing method for automatic license plate recognition according to one embodiment of the present disclosure.
Figure 7:
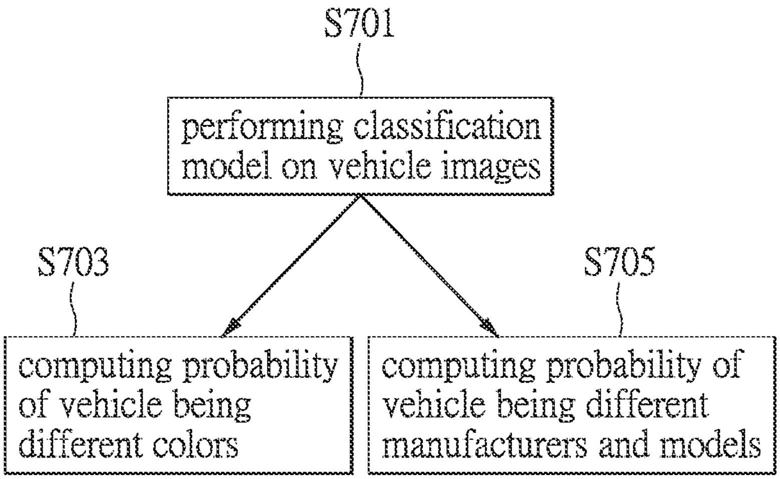
FIG. 7 is another flowchart illustrating the object-classification process in the edge-computing method for automatic license plate recognition according to another embodiment of the present disclosure.

Further, in the vehicle feature determination procedure 393, an object-classification process of the edge-computing method (as shown in FIG. 6 and FIG. 7) is performed according to one embodiment of the present disclosure.

Firstly, the image of the license plate is processed. In FIG. 6, when the confidence level calculation module 37 obtains the confidence score of the characters in each of the license plates in the continuous frames, the license plate having the highest confidence score can be regarded as the recognition result. In addition to storing the image of the frame that includes the license plate having the highest confidence score, a classification model is performed on the license plate (step S601).

According to one embodiment of the edge-computing system for automatic license plate recognition, a processor of an edge device performs an image-processing method to retrieve vehicle information. In one of the embodiments, the classification model is established by using a deep-learning method to learn image features of the information on a license plate. An intelligent model is used to calculate a probability that the license plate is registered under any vehicle jurisdiction (step S603). Taking an American license plate as an example, the deep-learning method is applied to learn features of the images of the license plates in every state, so that the established intelligent model can calculate the probability that the license plate belongs to any of the states in the U.S. Accordingly, the probabilities of the license plate belonging to different states can be used to identify the state 331 of the vehicle with the license plate having the highest confidence score.

Similarly, as shown in FIG. 7, the classification model is performed on the vehicle images (step S701), so as to calculate the probabilities that the vehicle has different colors (step S703). According to one of the embodiments of the present disclosure, a deep-learning method is used to learn the features of the vehicle with different colors from a large number of vehicle images, so as to train an intelligent model. The intelligent model can calculate the probabilities of the vehicle having different colors, so as to identify the color 332 of the vehicle with the license plate having the highest confident score.

Next, the classification model is used to calculate the probabilities that the vehicle is any model of different brands (e.g., the brand 333) (step S705). Similarly, a deep-learning method is used to learn features of a large number of images of an outline of the vehicle for training an intelligent model. The intelligent model can then be used to calculate the probabilities that the vehicle is any model of different brands, i.e., the brand 333 and its model.

The above-mentioned classification procedures can be used to calculate probabilities of the vehicle jurisdiction, and the color, the brand, and the model of the vehicle, so that the system can obtain the features of the vehicle. Thus, in FIG. 3, the vehicle information processing module 39 obtains information of the vehicle through the classification model. The vehicle information, the image of the vehicle, and the license plate image can be stored together to the storage module 38.

The system can identify the content of the license plate image cropped from one of the continuous frames through the confidence level calculation module 37. The license plate image is provided for the vehicle information processing module 39, and the vehicle detection procedure 391 obtains the vehicle corresponding to the recognized license plate. After the one or more vehicles are detected, the image can be cropped from the vehicle image and provided for determining the features of the vehicle.

Figure 8:
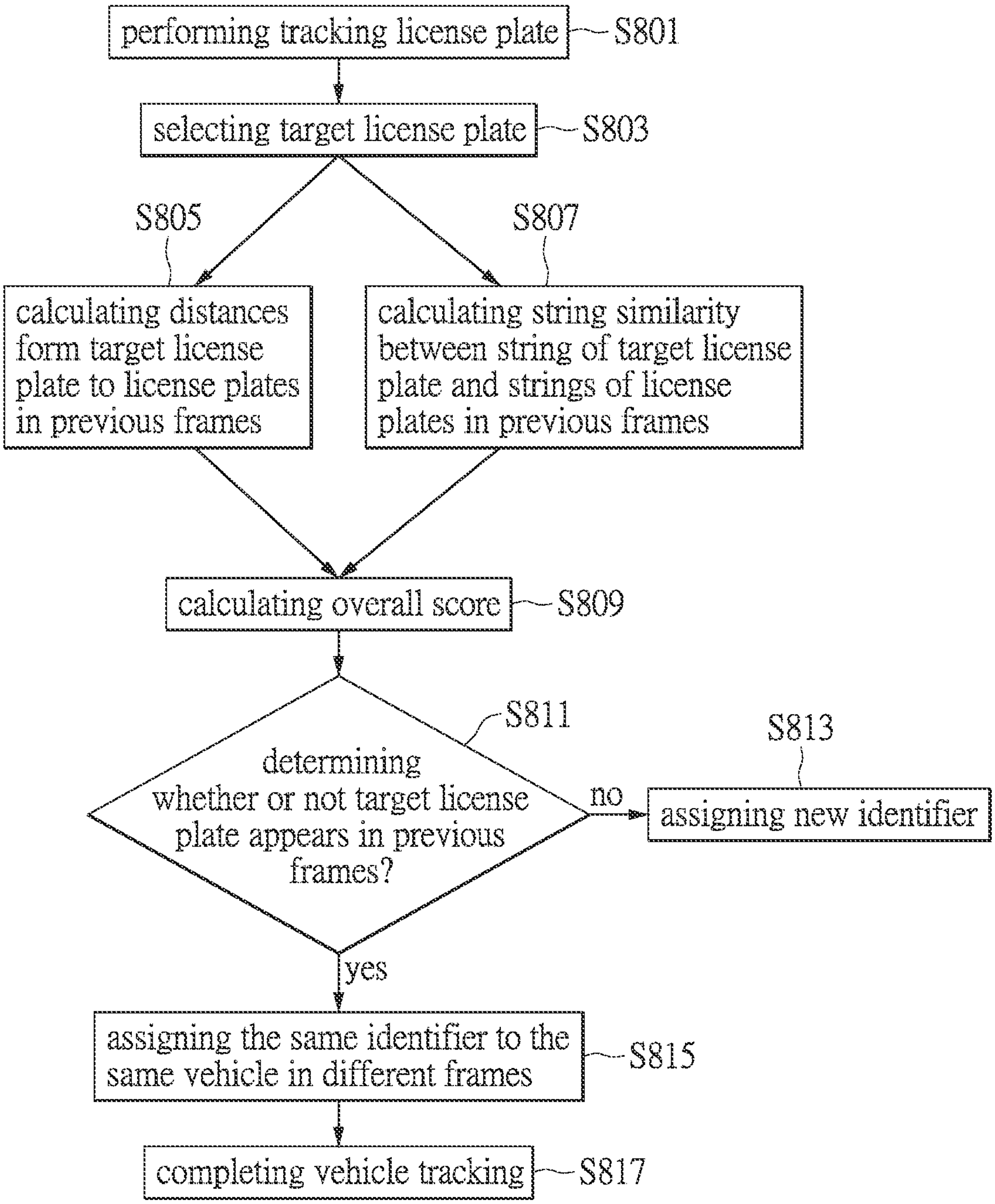
FIG. 8 is a flowchart illustrating a license plate tracking process in the edge-computing method for automatic license plate recognition according to one embodiment of the present disclosure.

The edge-computing method for automatic license plate recognition is performed in a terminal device for recognizing characters of each of the license plates in the continuous frames. The recognition result allows the system to perform license plate tracking. For more details, reference can be made to FIG. 8, which is a flowchart illustrating a license plate tracking process in the edge-computing method for automatic license plate recognition according to one embodiment of the present disclosure.

The license plate tracking process is performed (step S801), and a license-plate recognition model is used to frame-by-frame recognize one or more license plates in the images of continuous frames retrieved from a memory (e.g., the memory 207 of FIG. 2) according to the features of the license plate. Each recognized license plate is assigned with an identifier. One of the license plates in a first frame is selected to be a target license plate (step S803). More frames having the recognized license plates are retrieved from the memory. For example, a second frame (which represents any of the frames before or after the first frame) is retrieved from the memory. A distance between the target license plate in the first frame and each of one or more license plates recognized in the second frame can be calculated, so as to obtain one or more license-plate distances (step S805).

According to one of the embodiments, in order to track the same license plate in different frames, the distance relationship between the target license plate of the first frame and every license plate of the second frame can be obtained. The distance relationship can be referred to for determining whether or not the target license plate of the first frame appears in the second frame. More particularly, the distance between the object in different frames will still change since the same object (e.g., the license plate) appears in the dynamic continuous frames. A position of an object in the first frame with respect to a plain coordinate of the first frame is different from the position of the same object in the second frame with respect to the plain coordinate. Therefore, the distance between the same objects in the different frames can be used as one basis for determining whether or not the target license plate appears in the second frame.

However, it should be noted that the license-plate distance cannot be the only basis for identifying the same license plate in the previous and following frames. As such, a string similarity between the string recognized from the target license plate in the first frame and the string of the one or more license plates in the second frame (which represents frames other than the first frame) is also incorporated for identification purposes (step S807). According to one embodiment of the present disclosure, the strings of the target license plate in the first frame and other license plates in the second frame are firstly recognized to calculate the string similarity. One way of calculating the string similarity is Levenshtein distance calculation. The concept of the Levenshtein distance is to measure the difference between the two strings and to obtain a minimum editing number for converting a first string to a second string. The fewer the number of editing, the higher the string similarity. That is to say, the string similarity is low if more edits are needed for completing the conversion between the two strings. The edit distance can be normalized to be from 0 to 1. The two strings are identical if the edit distance is 0, and the two strings are completely different if the edit distance is 1.

When the license-plate distance and the string similarity between the target license plate of the first frame and each of the license plates of the second frame are obtained, an overall score based on the license-plate distance and the string similarity is calculated (step S809). The overall score is referred to for determining whether or not the target license plate of the first frame is any of the license plates of the second frame. Furthermore, the system sets an overall score threshold for comparison with the overall score, so as to determine whether or not the target license plate of the first frame appears in other frames (step S811).

If the overall score indicates that the target license plate of the first frame does not appear in the second frame (represented as "no"), the license plates in the other frames are determined to be new license plates, and the system assigns new identifiers to the new license plates (step S813). Thus, after repeating the above steps, another license plate in the first frame is selected as a new target license plate for determining whether or not the new target license plate appears in the second frame. In the meantime, when it is determined that the new target license plate appears in the second frame according to the new overall score (represented as "yes"), the same vehicle in different frames will be assigned with the same identifier (step S815). The same license plate is labeled with the same identifier in the following continuous frames for completing the license plate tracking process (step S817).

More particularly, when the license plates having the same identifier in the continuous frames have been tracked for a period of time, the system stores the full frame image having the highest confidence score, or stores a plurality of full frame images with the confidence scores that meet a threshold.

In summation, in the edge-computing method and the edge-computing system for automatic license plate recognition provided by the present disclosure, the intelligent model used in the method can be performed by an edge device for recognizing the position of a license plate and extracting an image of the license plate. Afterwards, a string of the license plate can be recognized. Since only the frame having the best recognition result is processed in the following process, the requirement of the computing power can be reduced. Therefore, the edge-computing method is applicable to a terminal device with limited computing power.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An edge-computing method for automatic license plate recognition, which is performed in an edge device, comprising:

receiving a streaming video having continuous frames;

frame-by-frame determining one or more license plates, and extracting an image of each of the one or more license plates in each of the continuous frames from full frame images of the continuous frames;

frame-by-frame recognizing one or more characters in each of the one or more license plates in each of the continuous frames, calculating one or more confidence levels of the one or more characters recognized from every one of the one or more license plates, and obtaining a confidence score from the one or more confidence levels of all of the one or more characters recognized from every one of the one or more license plates, wherein, after the one or more characters of each of the one or more license plates in the continuous frames are recognized, a license plate tracking process is performed for:

frame-by-frame recognizing one of the one or more license plates, and selecting a target license plate in a first frame of the continuous frames;

calculating a physical distance between the target license plate in the first frame and each of one or more license plates recognized in a second frame of the continuous frames individually, so as to obtain one or more license-plate distances with respect to the one or more license plates recognized in the second frame; and determining whether or not the target license plate in the first frame is any of the one or more license plates recognized in the second frame based upon the physical distance;

calculating the confidence score of each of the one or more license plates multiple times in the continuous frames within a period of time, and obtaining a recognition result of a license plate of the one or more license plates having a highest confidence score in one of the continuous frames; and storing a full frame image that corresponds to the image of the license plate having the highest confidence score.

2. The edge-computing method according to claim 1, wherein recognizing the one or more characters in each of the one or more license plates comprises recognizing the one or more characters in each of the one or more license plates by incorporating an intelligent model, and calculating the one or more confidence levels of the one or more characters recognized from every one of the one or more license plates comprises calculating the one or more confidence levels using an intelligent algorithm.

3. The edge-computing method according to claim 2, wherein the confidence score of each of the one or more license plates is a statistical value that is calculated according to the one or more confidence levels of the one or more characters of a corresponding one of the one or more license plates.

4. The edge-computing method according to claim 3, wherein, when the confidence score of each of the one or more license plates is calculated, a quantity of the one or more recognized characters of the corresponding one of the one or more license plates is required to exceed a character-quantity threshold; wherein, the automatic license plate recognition fails when the quantity of the one or more recognized characters of the corresponding one of the one or more license plates is lower than the character-quantity threshold.

5. The edge-computing method according to claim 4, wherein multiple confidence scores of the corresponding one of the one or more license plates are calculated at intervals in the continuous frames, and a frame of the continuous frames having the highest confidence score is obtained before the corresponding one of the one or more license plates disappears.

6. The edge-computing method according to claim 5, wherein, when the frame having the highest confidence score of the corresponding one of the one or more license plates is obtained, vehicle information is obtained from the frame by an image processing technology, and the vehicle information is written into metadata of the frame.

7. The edge-computing method according to claim 1, comprising operating, by the edge device, an object-detection model for obtaining a boundary frame of the one or more license plates in each of the continuous frames, calculating a probability that the boundary frame is one of the one or more license plates, and calculating a probability that one of the one or more license plates belongs to a vehicle type, so as to recognize the one or more characters in the one of the one or more license plates.

8. The edge-computing method according to claim 1, comprising operating, by the edge device, a classification model for calculating a probability that one of the one or more license plates is under a vehicle jurisdiction, calculating a probability that a vehicle is one of a plurality of colors, and calculating a probability that the vehicle is one of a plurality of brands and models, such as to identify features of the vehicle.

9. The edge-computing method according to claim 1, wherein, after the one or more characters of each of the one or more license plates in the continuous frames are recognized, a license plate tracking process is performed for:

recognizing strings of the target license plate in the first frame and the one or more license plates recognized in the second frame;

individually calculating a string similarity between the string that is recognized from the target license plate in the first frame and the string that is recognized from each of the one or more license plates recognized in the second frame; and calculating an overall score according to the license-plate distance and the string similarity between the target license plate in the first frame and each of the one or more license plates recognized in the second frame;

wherein determining whether or not the target license plate in the first frame is any of the one or more license plates recognized in the second frame comprises determining whether or not the target license plate in the first frame is any of the one or more license plates recognized in the second frame according to the overall score; and wherein the target license plate appearing in the first frame and one of the one or more license plates recognized in the second frame that is determined as the target license plate according to the overall score are assigned with a same identifier, so as to perform the license plate tracking process in the continuous frames.

10. The edge-computing method according to claim 9, wherein, when license plates having the same identifier in the continuous frames have been tracked for a period of time, the full frame image having the highest confidence score is stored, or a plurality of full frame images having confidence scores that meet a threshold are stored.

11. An edge-computing system for automatic license plate recognition, comprising:

a photographing module;

a memory; and a processor electrically connected with the photographing module and the memory, wherein the processor performs an edge-computing method for automatic license plate recognition, and the edge-computing method comprises:

using the photographing module to generate a streaming video having continuous frames;

frame-by-frame determining one or more license plates, and extracting an image of each of the one or more license plates in each of the continuous frames from full frame images of the continuous frames; wherein the image is temporarily stored in the memory;

frame-by-frame recognizing one or more characters in each of the one or more license plates in each of the continuous frames, calculating one or more confidence levels of the one or more characters recognized from every one of the one or more license plates, and obtaining a confidence score from the one or more confidence levels of all of the one or more characters recognized from every one of the one or more license plates, wherein, after the one or more characters of each of the one or more license plates in the continuous frames are recognized, a license plate tracking process is performed for:

frame-by-frame recognizing one of the one or more license plates, and selecting a target license plate in a first frame of the continuous frames;

calculating a physical distance between the target license plate in the first frame and each of one or more license plates recognized in a second frame of the continuous frames individually, so as to obtain one or more license-plate distances with respect to the one or more license plates recognized in the second frame; and determining whether or not the target license plate in the first frame is any of the one or more license plates recognized in the second frame based upon the physical distance; and calculating the confidence score of each of the one or more license plates multiple times in the continuous frames within a period of time, and storing a full frame image that corresponds to the image of a license plate of the one or more license plates having a highest confidence score in the memory.

12. The edge-computing system according to claim 11, wherein the processor operates an intelligent algorithm to train data, so as to obtain an object-detection model and a classification model.

13. The edge-computing system according to claim 12, wherein the object-detection model is operated to obtain a boundary frame of the one or more license plates in each of the continuous frames, calculate a probability that the boundary frame is one of the one or more license plates, and calculate a probability that one of the one or more license plates belongs to a vehicle type, so as to recognize the one or more characters in the one of the one or more license plates.

14. The edge-computing system according to claim 12, wherein the classification model is operated to calculate a probability that one of the one or more license plates is under a vehicle jurisdiction, a probability that a vehicle is one of a plurality of colors, and calculate a probability that the vehicle is one of a plurality of brands and models, such as to identify features of the vehicle.

15. The edge-computing system according to claim 11, wherein an intelligent model is incorporated to recognize the one or more characters in each of the one or more license plates, and an intelligent algorithm is used to calculate a confidence level of each of the one or more characters in each of the one or more license plates; wherein the confidence score of each of the one or more license plates is a statistical value obtained by calculating the one or more confidence levels of the one or more characters in a corresponding one of the one or more license plates.

16. The edge-computing system according to claim 15, wherein, when the confidence score of each of the one or more license plates is calculated, a quantity of the one or more recognized characters of the corresponding one of the one or more license plates is required to exceed a character-quantity threshold; wherein, the automatic license plate recognition fails when the quantity of the one or more recognized characters of the corresponding one of the one or more license plates is lower than the character-quantity threshold.

17. The edge-computing system according to claim 16, wherein multiple confidence scores of the corresponding one of the one or more license plates are calculated at intervals in the continuous frames, and a frame of the continuous frames having the highest confidence score is obtained before the corresponding one of the one or more license plates disappears.

18. The edge-computing system according to claim 17, wherein, when the frame having the highest confidence score of the corresponding one of the one or more license plates is obtained, vehicle information is obtained from the frame by an image processing technology, and the vehicle information is written into metadata of the frame.

19. The edge-computing system according to claim 17, wherein, when the frame having the highest confidence score in the continuous frames is obtained, the frame and a recognized string of the corresponding one of the one or more license plates are transmitted to an external system.

20. The edge-computing method according to claim 1, wherein frame-by-frame recognizing one or more characters in each of the one or more license plates in each of the continuous frames comprises frame-by-frame recognizing a set of characters in each of the one or more license plates in each of the continuous frames, and calculating one or more confidence levels of the one or more characters recognized from every one of the one or more license plates comprises calculating a confidence level for each character of the set of characters recognized from every one of the one or more license plates.

* * * * *